United States Patent [19]

Bauer et al.

[11] Patent Number: 4,501,614

[45] Date of Patent: Feb. 26, 1985

[54] FLUX IN RECOVERY OF ALUMINUM IN REVERBERATORY FURNACE AND METHOD OF MAKING

[75] Inventors: Carl F. Bauer, Chicago, Ill.; James H. Hussey, Hammond, Ind.; Benny Langston, Barrington; Niranjan M. Parikh, Winnetka, both of Ill.

[73] Assignee: American Can Company, Greenwich, Conn.

[21] Appl. No.: 527,192

[22] Filed: Aug. 26, 1983

Related U.S. Application Data

[63] Continuation of Ser. No. 328,604, Dec. 8, 1981, Pat. No. 4,451,287.

[51] Int. Cl.³ .............................................. C22B 21/00
[52] U.S. Cl. ...................................... 75/257; 264/140; 75/68 R; 75/93 AC
[58] Field of Search ................. 75/257, 68 R, 93 AC; 264/140

[56] References Cited

U.S. PATENT DOCUMENTS

| | | | |
|---|---|---|---|
| 1,950,967 | 3/1934 | Bonsack | 75/68 R |
| 1,981,798 | 11/1934 | Bonsack | 75/68 R |
| 2,101,553 | 12/1937 | Mattsson | 148/26 |
| 2,148,664 | 2/1939 | Wille et al. | 148/26 |
| 2,802,762 | 8/1957 | Stetson | 148/26 |
| 2,987,391 | 6/1961 | Foster et al. | 75/68 R |
| 3,043,678 | 7/1962 | Lowry et al. | 75/68 R |
| 3,189,491 | 6/1965 | Robbins | 75/257 |
| 3,649,247 | 3/1972 | Brondyke et al. | 75/68 R |
| 3,650,730 | 3/1972 | Derham | 75/68 R |
| 3,754,897 | 8/1973 | Derham | 75/68 R |
| 3,769,001 | 10/1973 | Valdo et al. | 75/68 R |
| 3,798,024 | 3/1974 | Murphy et al. | 75/24 |
| 4,030,914 | 6/1977 | Papafingos et al. | 75/68 R |
| 4,073,644 | 2/1978 | Papafingos et al. | 75/68 R |

Primary Examiner—M. J. Andrews
Attorney, Agent, or Firm—Stuart S. Bowie; Thomas D. Wilhelm

[57] ABSTRACT

An improved flux used for the recovery of metallic aluminum from dross in a reverberatory furnace. The flux is an alloyed mixture of sodium chloride and potassium chloride in approximately equal parts by weight which has been preheated and then cooled to form an alloyed mixture. A small amount of cryolite can be added to the liquid mixture before cooling to improve the recovery of metal obtained than when the salt and potash flux mixture is used alone.

5 Claims, 1 Drawing Figure

FLUX IN RECOVERY OF ALUMINUM IN REVERBERATORY FURNACE AND METHOD OF MAKING

This application is a continuation Ser. No. 328,604 filed Dec. 8, 1981 now U.S. Pat. No. 4,451,287.

This invention relates to an improved flux which can be used to process dross type materials in reverberatory furnaces to increase the metal recovered from these drosses.

BACKGROUND OF THE INVENTION

The secondary aluminum industry is concerned with the production of aluminum from slag, dross and scraps of a variety of origins generally unknown. Consequently, the constituents used in the secondary recovery furnaces contain impurities and oxides which must be separated during the melting process in order to segregate the valuable metal. It is important to have a flux which separates the metal from the scrap which includes a variety of dross, slag, recycled scrap, discarded cans and containers, salvaged castings and the like. Because of the nature of some of the scrap including its impurities, oxides and size of individual pieces, it becomes necessary to apply salt fluxes to minimize oxidation and improve slag formation during melting and thereby enhance the recovery rate of the valuable metal.

In particular, the dross type scrap which is produced by the primary aluminum companies and which is made by dry skimming the waste made in remelting furnaces represents one of the most valuable and yet most difficult types of material to process in the secondary aluminum industry.

The primary components of the dross are a plurality of aluminum oxides, hydrated aluminum oxides and entrained metallic aluminum plus small amounts of magnesium chloride, aluminum carbide, aluminum nitrade and small percentages of calcium, silicon, magnesium, iron, zinc and manganese.

Because of the nature of the dross material which normally contains a sizeable fraction of non-metallic materials, several different types of secondary melting furnaces have been developed to process different types of scraps. In general, two types of furnaces are used to process scrap aluminum wastes. These are the rotary furnace and the reverberatory furnace. Both furnaces are suitable for processing all types of aluminum scraps, however, for individual specific scraps, one furnace may have advantages in its ability to recover metallic aluminum from the specific charge material.

Thus, for example, the rotary furnace may be shown to recover higher values of metal from low quality scraps such as drosses when these same drosses are processed by the reverberatory furnace; it does so, however, with the proviso that it is operated less economically because of the need for high quantities of flux salt and because of the inherent problems associated with the production of large quantities of salt containing waste products.

On the other hand, the reverberatory furnace can process the same dross material and produce lower quantities of waste product and recovered metal more economically, but it does so only at the expense of reduced metal recovery.

Thus there exists in the secondary aluminum recovery business a need for a flux or flux and process combination which would provide the highly efficient metal recovery of the rotary furnace while at the same time would produce this high recovery in the reverberatory furnace to take advantage of this type of furnace's economic advantages.

The quantities and compositions of fluxes used in the secondary industry depend very much on the particular plant, the operating practice, and the type of feed material used by numerous companies.

Generally, all rotary type furnaces employ chloride fluxes either as pure NaCl or as a physical mixture of NaCl and KCl. Furthermore, for rotary furnaces, it is customary to charge the salt flux into an empty furnace, melt the salt and then charge the scrap into the molten melt. This is particularly true for mixtures of NaCl and KCl. The advantage of this process is that it provides a flux which has a significant fluidity which acts like water. This fluidity depends on the composition, temperature and concentration ratio of the flux to the inert ingredients in the charge material. In order to take advantage of this fluidity, it is essential that the concentration ratio of flux to inert ingredients be greater than one (1) and that more flux than inert ingredients in the charge be used since too little flux leads to poor metal recovery. Unfortunately, because of the inherent design of reverberatory furnaces which utilize skim eye doors for the effective transfer of thermal energy to open charge wells, the flux mixture, usually 50% NaCl and 50% KCl, cannot be charged and melted on the well first since the liquid runs under and around the skim eye doors where it comes in contact with the high temperature in the combustion box of the furnace and becomes superheated which causes flux loss by evaporation, wastes energy and creates a serious pollution problem.

Furthermore, the flux in a ratio greater than 1 flux to 1 insert oxide cannot be added after the charge has been placed on the reverberatory furnace well because on melting, the same problems exist as if it had been introduced initially.

To overcome this problem, fluxes of the NaCl and/or NaCl/KCl salts are normally used in reverberatory furnaces at a ratio of 0.6 to 0.8 flux to inert ingredient.

Using the flux with the above composition ratio leads to the production of a very viscous pastey slag which contains a high proportion of oxides and which can be physically removed from the furnace. However, this slag unfortunately contains a large quantity of metal which is not recovered in the furnace.

OBJECTS OF THE INVENTION

It is a primary object of the present invention to improve the process of the recovery of metal from dross in reverberatory furnaces.

It is a further object of this invention to combine the advantages ascribed in rotary furnaces for processing dross types of materials with the economic advantages of processing these same materials in a reverberatory furnace and to thus provide high metallic recovery from material processed in reverberatory furnaces.

It is a further object of this invention to provide an alloyed salt composition on the open charge well of a reverberatory furnace to enhance metal recovery from dross material which is substantially higher than the metal recovery presently obtained.

It is a further object of this invention to provide a prealloyed composition of NaCl and KCl salts as a flux for processing materials such as drosses which is used in quantities substantially lower than the quantities used in rotary furnaces and in reverberatory furnaces.

It is a further object of this invention to provide means of processing low metallic containing dross types of materials with an alloyed salt mixture on the charge well of a reverberatory furnace to provide substantially higher metallic recovery of the metal values of dross material while at the same time producing an innocuous furnace skim waste product which can be easily removed to land fill without serious consequence.

It is a further object of this invention to enhance recovery of metal value from dross materials while simultaneously reducing the total volume of flux used on the reverberatory furnace to produce a slag waste product containing a low concentration of chloride salts.

The above objects as well as others are accomplished generally speaking by using as a flux an alloyed mixture of salt and potash in the form of solid solution thereby improving significantly the metal recovered in a reverberatory furnace.

DESCRIPTION OF A PREFERRED EMBODIMENT

Figure 1:
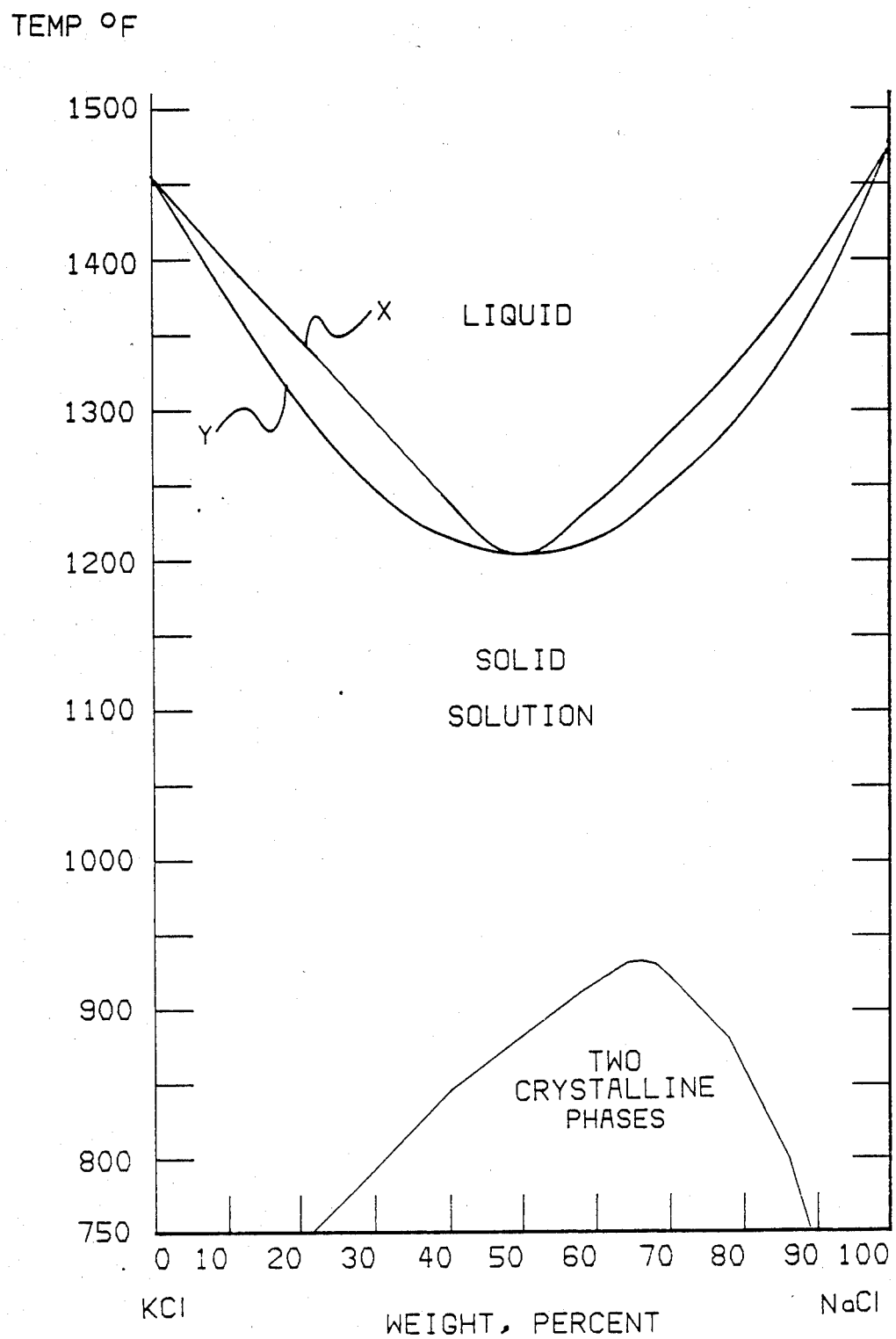
FIG. 1 is a composition diagram for mixtures of NaCl and KCl salts with temperature vs. weight by percent according to the present invention.

It will be appreciated from FIG. 1 that the individual chemical compounds NaCl and KCl are crystalline in nature and have a melting point of 1472° F. and 1454° F., respectively. In FIG. 1 X defines a liquidous boundary for the composition according to the weight by percent defined by the abscissa. Also Y defines a solidous boundary for the composition according to the weight by percent defined by the abscissa. Thus the area between X and Y define a partly liquid partly solid composition. As also shown in FIG. 1 with mixtures ranging from 40 percent NaCl and 60 percent KCl to 60 percent NaCl and 40 percent KCl, a solid solution mixture having a melting point at approximately 1225° F. is produced. In accordance with the present invention the two salts are alloyed together to yield a solid solution having the relatively lower melting point. In the absence of integral contact of alloyed salts, when sodium and potassium salts are charged into the bath, temperatures greater than their individual melting points are required to yield a solid solution compound. Thus, the use of an alloyed salt of about equal parts of NaCl and KCl by weight results in the immediate availability of the relatively low melting point mixture used for fluxing of metallic aluminum in drosses. It will be appreciated as in many salt-potash mixtures, the use of fluoride salts or amounts of cryolite to the solid solution salt improves the recovery of metal over that obtained when the salt potash flux alone is used.

In carrying out the preferred embodiment, the two salts used must be weighted proportionately in about equal parts to provide for a suitable mechanical mixture. As shown by FIG. 1 the mixtures can range from 40 to 60 percent by weight each of NaCl and KCl to produce the intended result. After mixing, it is necessary to preheat the salt mixture to produce a liquid which then provides for complete alloying and chemical intermixing of the mechanically mixed salts. To this can be added a small concentration of cryolite of about less than 3 percent by weight to improve recovery of metal.

After alloying of the salt mixture takes place, the material is poured from the thermal furnace and allowed to cool to room temperature. Subsequent to cooling, the solid solution salts are then processed in a hammer mill or grinding mill to produce particles of solid solution salt which can be used as a flux. These particles will, of course, vary in size but for our teaching, it is believed that they should be no larger than ¾ inch and should pass at a minimum through a ¾ inch mesh screen.

Upon completion of the above treatments, the thermally prepared solid solution of NaCl-KCl has been found to provide an extremely active flux which can be used in low concentrations on the charge well of reverberatory furnaces to process dross type materials and attain metal recovery from these dross materials at levels comparable with rotary furnaces while simultaneously providing a dry slag skim on the furnace well which can be easily removed by the reverberatory furnace operator.

The optimum metallic recovery from dross type materials is obtained when the above described thermally prepared flux is used in a concentration ratio of 0.3 to 0.4 flux to inert ingredient. Because of the lower melting point of thermally prepared solid solution flux mixture, the flux has better dispersion ability within the dross charge on the furnace well, resulting in highly improved metallic recovery in the reverberatory furnace.

What is claimed is:

1. A flux composition for use in the recovery of metal from dross in a reverberatory furnace, the improvement wherein the flux consists essentially of a solid mixture which is 40% to 60% sodium chloride and 60% to 40% potassium chloride, said flux composition being produced by mechanically mixing sodium chloride and potassium chloride, heating the mixture to produce a liquid to effect complete alloying and chemical mixing thereof, cooling the mixture to solidify it, then milling the mixture to produce particles of a size no larger than 0.75 inches, said flux being functional to yield optimum metal recovery from dross type materials when used in a reverberatory furnace in a concentration ratio of 0.3 to 0.4 flux to inert ingredients.

2. A flux composition according to claim 1 further including cryolite in an amount less than 3 percent by weight.

3. A method of producing a flux for improved recovery of aluminum from dross in a reverberatory furnace comprising the steps of mechanically mixing a solid mixture which consists essentially of 40% to 60% sodium chloride and 60% to 40% potassium chloride, heating the mixture to produce a liquid to effect complete alloying and chemical mixing thereof, cooling the mixture to solidify it, and then milling the mixture to produce particles of a size no larger than 0.75 inches whereby a pre-alloyed solid flux is produced which flux yields optimum metal recovery from dross type materials when used in a reverberatory furnace in a concentration ratio of 0.3 to 0.4 flux to inert ingredients.

4. A method according to claim 3 wherein the melting point of the resulting mixture is about 1225° F.

5. A method as in claim 3 and including, in said mixture, cryolite in an amount less than about three percent by weight.

* * * * *